United States Patent

Kansa et al.

[11] Patent Number: 5,906,748
[45] Date of Patent: May 25, 1999

[54] SEPARATION OF TOXIC METAL IONS, HYDROPHILIC HYDROCARBONS, HYDROPHOBIC FUEL AND HALOGENATED HYDROCARBONS AND RECOVERY OF ETHANOL FROM A PROCESS STREAM

[75] Inventors: Edward J. Kansa, Livermore; Brian L. Anderson, Lodi; Ananda M. Wijesinghe, Tracy; Brian E. Viani, Oakland, all of Calif.

[73] Assignee: The Regents of the University of California, Oakland, Calif.

[21] Appl. No.: 08/495,293

[22] Filed: Jun. 27, 1995

[51] Int. Cl.$^6$ .................................................. B01D 15/00
[52] U.S. Cl. ..................... 210/640; 210/259; 210/804; 210/799; 210/767; 210/638; 210/660; 203/52
[58] Field of Search ...................... 210/640, 259, 210/257.2, 638, 804, 799, 767, 805, 660, 749; 134/25.1; 203/52

[56] References Cited

U.S. PATENT DOCUMENTS

| | | | |
|---|---|---|---|
| 4,983,304 | 1/1991 | Tsugita et al. ......................... | 210/640 |
| 5,160,636 | 11/1992 | Gilles et al. ............................. | 210/763 |
| 5,269,933 | 12/1993 | Jehle et al. ............................... | 210/640 |
| 5,302,287 | 4/1994 | Losack .................................... | 210/612 |
| 5,376,182 | 12/1994 | Everett et al. ......................... | 134/25.1 |
| 5,453,133 | 9/1995 | Sparks et al. .......................... | 134/25.1 |
| 5,505,925 | 4/1996 | Fristad .................................... | 423/1 |
| 5,593,248 | 1/1997 | Kansa et al. ............................ | 405/128 |
| 5,634,983 | 6/1997 | Kammeraad ............................ | 134/25.1 |

*Primary Examiner*—Ana Fortuna
*Attorney, Agent, or Firm*—John P. Wooldridge

[57] ABSTRACT

This invention provides a process to tremendously reduce the bulk volume of contaminants obtained from an effluent stream produced subsurface remediation. The chemicals used for the subsurface remediation are reclaimed for recycling to the remediation process. Additional reductions in contaminant bulk volume are achieved by the ultra-violet light destruction of halogenated hydrocarbons, and the complete oxidation of hydrophobic fuel hydrocarbons and hydrophilic hydrocarbons. The contaminated bulk volume will arise primarily from the disposal of the toxic metal ions. The entire process is modular, so if there are any technological breakthroughs in one or more of the component process modules, such modules can be readily replaced.

13 Claims, 3 Drawing Sheets

SEPARATION OF TOXIC METAL IONS, HYDROPHILIC HYDROCARBONS, HYDROPHOBIC FUEL AND HALOGENATED HYDROCARBONS AND RECOVERY OF ETHANOL FROM A PROCESS STREAM

CROSS REFERENCE TO RELATED APPLICATION

The copending, commonly assigned patent application and having Ser. No. 08/495,294, entitled "A Nontoxic Chemical Process For In Situ Permeability Enhancement And Accelerated Decontamination Of Fine-Grain Subsurface Sediments", filed on the same date as the instant application, is fully incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates generally to subsurface decontamination or remediation, and more particularly, to the separation of toxic metal ions, hydrophilic hydrocarbons and hydrophobic fuel and halogenated hydrocarbons from a primarily cationic flocculent, ethanol and water effluent stream.

2. Description of Related Art

The National Research Council (NRC) (1994) published a book entitled, "Alternatives to Groundwater Cleanup" that summarized the current state of the art in removing subsurface contaminants. In summary, the NRC arrived at the following conclusions. Current and developing technologies are cost-effective in remediating coarse-grained sediments (CGS) such as sands and gravels, but ineffective in removing contaminants from fine-grained sediments (FGS). The reason for the inability of present and developing technologies to remediate the FGS is primarily the very low hydraulic conductivity of FGS that effectively stops the flow of flushing fluids such as water, air and steam from penetrating the FGS and flushing contaminants away. In contrast, the CGS have hydraulic conductivities that are many orders of magnitude greater than that of FGS. Thus, advection can readily flush contaminants from such CGS.

In the copending, commonly assigned patent application, Ser. No. 08/495,294 entitled "A Nontoxic Chemical Process For In Situ Permeability Enhancement And Accelerated Decontamination Of Fine-Grain Subsurface Sediments", fully incorporated herein by reference, a method for remediating contaminated FGS is described in which safe cationic flocculents (CF) such as gypsum, ferric hydroxide, or aluminum polyhydroxide and organic solvents (OS), such as ethanol, are injected into both the subsurface saturated or groundwater zone and in the unsaturated or vadose zone to alter the FGS fabric to produce a flocculated and/or cracked material whose hydraulic conductivity is vastly increased. Both the CF and OS produce this desired result by collapsing the negative double layer surrounding the water saturated clay particles.

The organic solvent that should be considered in the subsurface remediation process should be chosen to have the following characteristics: It should not be prohibited by the United States Environmental Protection Agency (EPA) from being introduced to the subsurface, must be relatively inexpensive, must have a viscosity similar to water, must have a high boiling temperature and must be soluble in water. Furthermore, the following classes of chemicals should be either miscible or highly soluble in this organic solvent: hydrophilic hydrocarbons, and the hydrophobic fuel and halogenated hydrocarbons. This organic solvent should have a dielectric constant considerably lower than that of water. An example organic solvent that meets all the above characteristics is ethanol. The process in this invention is not limited to a specific organic solvent such as ethanol provided the replacement OS meets regulatory requirements and meets or exceeds these desired characteristics listed above.

The example organic solvent, ethanol has the distinct advantage in that sorbed hydrophobic contaminants readily partition into ethanol, the hydrophobic hydrocarbon contaminants are either completely miscible or highly soluble in ethanol, and hydrophilic contaminants are readily miscible in it.

In addition, clayey bodies that constitute FGS are intrinsically negatively charged due to the persistence of the negative double layer in water saturated clays. In the unaltered state, toxic metal ions such as the radioactive series as well as substances like As, Cd, Cr, Cu, Pb, Hg, etc., cations are attached to the clay bodies. Random perturbations in the ground water flow may dislodge such contaminants, providing a continuing source of pollution for many years, even though the high hydraulic conductivity soils have been remediated.

The alteration of the clayey fabric of the FGS due to the introduction of cationic flocculents (CF), a suitable OS like ethanol, and water-and OS soluble chelates will mobilize the following contaminants: toxic metal ions, hydrophobic fuel and halogenated hydrocarbons, and hydrophilic hydrocarbons that will be extracted from the subsurface.

The economic viability of the copending patent application referred to above, that deals specifically with remediating contaminated fine-grained sediments, depends highly upon contaminated bulk reduction, since the proper disposal of contaminants is very expensive. The bulk reduction is accomplished by a special combination of existing technologies to achieve the stated goal of contaminant bulk reduction.

In current technologies dealing with the remediation of contaminated subsurfaces, the following processes are typically observed in treating the contaminant effluent stream:

1. Removal of soil particles form the effluent stream.
2. The removal of hydrocarbons by a combination of processes:
   A. Air-stripping the readily volatilized hydrocarbons, and
   B. Adsorption of contaminants onto an activated carbon bed.
3. Ultra-violet light destruction of halogenated hydrocarbons.
4. Purification of the groundwater for reinjection.
5. Purification of the vapor phase stream.

SUMMARY OF THE INVENTION

It is an object of the present invention to provide a method for separation of toxic metal ions, hydrophilic hydrocarbons, hydrophobic fuel halogenated hydrocarbons and ethanol recovery from a process stream.

It is another object of the present invention to provide a process by which the large bulk of a contaminated effluent stream can be vastly reduced.

In the fine-grained sediment chemical process, described in copending, commonly assigned patent application entitled "A Nontoxic Chemical Process For In Situ Permeability Enhancement And Accelerated Decontamination Of Fine-Grain Subsurface Sediments", the contaminated effluent mixture is pumped to the surface by a set of extraction wells. The use of cationic flocculents, ethanol, and chelates to remove and mobilize contaminants in clay bodies presents a unique effluent separation challenge. The effluent stream will consist of cationic flocculents (CF), chelated toxic metal ions (CH-TMI), fuel hydrocarbons (FH), halogenated hydrocarbons (HH) and hydrophilic hydrocarbons in an organic solvent (OS)-water carrier stream. The challenge is the economical and complete separation of CH-TMI, FH, HH, and hydrophilic hydrocarbons from the ethanol-water stream, the separation of OS (ethanol) from water, and the reduction of the bulk volume of contaminated wastes required for disposal.

The separation of an effluent waste steam can be achieved with modular combinations of standard technologies. The first step requires that the soil particles be separated from the effluent stream since they could foul the chemical separation process. Soil removal can be partially accomplished with an effluent settling tank. The remaining extremely fine suspended soil particles can be removed by commercially available centrifuges and filters. The water that is used for cleaning the soil particles is then stored with the remaining liquid effluent.

If $Al^{3+}$ or $Fe^{3+}$ is the active ion in the cationic flocculent, each can be separated from the groundwater waste stream by raising the pH and precipitating the hydroxides. The precipitants are then filtered from the effluent stream. The TMI that have been detoxified, sequestered, and mobilized by ion-specific chelates are removed from the subsurface in the effluent, and the chelates can be separated at the surface facility, and recovered for reuse. The TMI can be dechelated readily by adjusting the pH of the effluent stream and removed by using the well-established ion-exchange resin technology, or other suitable methods. The cationic flocculents and chelates are tested for residual contaminants, and, if necessary, reprocessed by the above-mentioned technologies and recover them for reuse.

The next chemical separation phase deals with the removal of the hydrophilic hydrocarbons, and hydrophobic fuel and halogenated hydrocarbons. Because the potential list of hydrocarbon contaminants at any given site can vary widely, the separation techniques require hybrid separation processes. Some possible contaminants may be the hydrophilic hydrocarbons such methanol, acetone, ketone, etc., the hydrophobic halogenated hydrocarbons such as TCE, PCE, $CCl_4$, $HCCl_{13}$, etc., and the hydrophobic fuel hydrocarbons such as heptane, octane, etc. Each one of these compounds will have a variety of boiling points and will be present in the effluent in rather small amounts. Counter-current air stripping of volatile species may be an effective way to remove some hydrocarbons. The resulting air stream can then be purified by passing it through a bed of activated carbon. The following table lists the vapor pressures of selected compounds at 25 C, see the CRC Handbook of Chemistry and Physics. Those compounds with vapor pressures at 25 C significantly less than that of water at 25 C can be more easily separated by counter-current air stripping.

TABLE 1

Vapor pressures of various compounds at 25 C

| Vapor Pressure (mm Hg) | Compound |
| --- | --- |
| 23.7 | water |
| 60.0 | ethanol |
| 46.5 | n-heptane |
| 29.8 | n-hexane |
| 158.2 | toluene |
| 7.0 | xylene(2) |
| 113.1 | trichloro-ethylene |
| 19.0 | tetrachloro-ethylene |
| 19.0 | carbon tetrachloride |
| 200.0 | chloroform |
| 77.5 | 1,1,1-trichloro-ethane |

Those contaminant compounds that are not effectively removed from the contaminated effluent stream by counter-current air stripping will require a more expensive process. It is possible to separate successfully mixtures of hydrophilic and hydrophobic hydrocarbons using granular activated carbon (GAC). For these three systems, the hydrophobic hydrocarbons were preferentially adsorbed onto the GAC for hydrocarbon mole fractions less than 0.6. A carbon material called Graphon has been developed that has only hydrophobic sites; the hydrophobic hydrocarbons will be preferentially adsorbed on Graphon for any hydrophobic hydrocarbon mole fraction.

In general, adsorption onto GAC is a chromatographic process where almost anything will adsorb, including mixture of a hydrophilic hydrocarbon such as ethanol and water, but it is site competition that separates the components. Since most hydrocarbon contaminants are hydrophobic, GAC will work for most contaminants of interest, excluding mixtures containing methanol, acetone, and other polar hydrophilic hydrocarbon contaminants. Effluent mixtures containing many hydrophilic hydrocarbons can be separated by counter-flow air stripping and distillation. Further removal of these hydrophilic hydrocarbons will be discussed later. However, expect that the mixture of contaminants, ethanol, and water will require a longer contact time and a longer GAC bed for efficient and total separation. The GAC will become saturated in time with contaminants, but can be regenerated by heat driving off the adsorbed contaminants. The contaminants that are driven off the GAC-Graphon can be either destroyed or consolidated in bulk for proper disposal. The halogenated hydrocarbons can be readily destroyed by ultra-violet light, thus reducing further the bulk of contaminants to be disposed.

Economical separation of hydrophilic contaminants and ethanol from water can be accomplished by two approaches: fractional distillation and molecular sieves, and molecular membrane pervaporation. The starting process used to separate water from a mixture of hydrophilic contaminants and ethanol is distillation; however, distillation becomes ineffective as the mixture approaches the ethanol-water azeotrope that is at 10.57 weight % water.

The complete removal of water with molecular sieve dehydration has been shown to be successful for ethanol-water mixtures for water concentrations up to 20 weight. Another method that can successfully separate hydrophilic hydrocarbons, an OS such as ethanol, and water is membrane pervaporation separation. Molecular membrane filters are superior in many aspects in their separation efficiency. The permselective membrane consists of an ultra-thin, dense nonporous layer (0.2–to 5.0 mm) that performs the separation on a micro-porous support that provides mechanical strength. The membranes are packaged into spiral-wound modules that enables a large membrane surface area to be contained in a small volume. The difference between pervaporation and all other membrane separation processes is the phase change from liquid feed to a vapor as it passes through the membrane. The mechanism is best described as a solution-diffusion one. To keep the chemical potential sufficiently high, the vapor pressure on the permeate side must be kept small by vacuum extraction or condensing it to a liquid by cooling.

The hydrophobic volatile solvents are concentrated most efficiently by pervaporation. Hydrophilic hydrocarbons, such as ethanol or acetone, are concentrated less efficiently, but can, nevertheless, be separated by recycling the stream through the membranes.

DETAILED DESCRIPTION OF THE INVENTION

Figure 1:
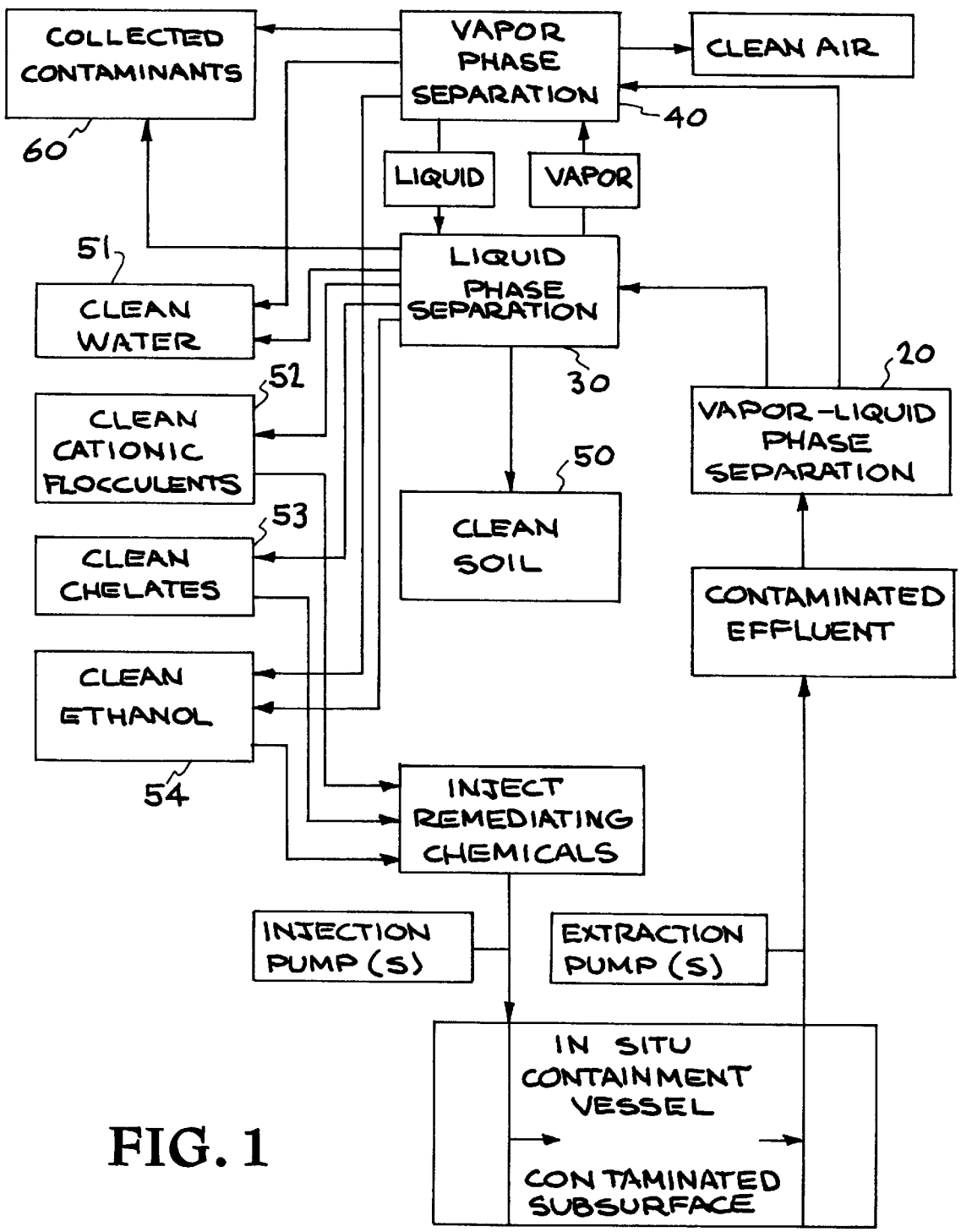
FIG. 1 shows an overall process diagram for the separation of a contaminated effluent stream.

FIG. 1 shows the overall processes occurring in this invention. The remediating chemicals (chelates, cationic flocculents, and ethanol) for treating a contaminated heterogeneous subsurface and/or a homogeneous subsurface of contaminated low permeability fine-grained sediments are injected, using one or more injection wells, into the subsurface. One or more extraction wells will remove from the contaminated effluent stream a mixture of the following effluent stream: soil particles, chelates, toxic metal ions, and chelated toxic metal ions, cationic flocculents, fuel hydrocarbons, halogenated hydrocarbons, hydrophilic contaminants, and ethanol in both the liquid and vapor phases.

Figure 2:
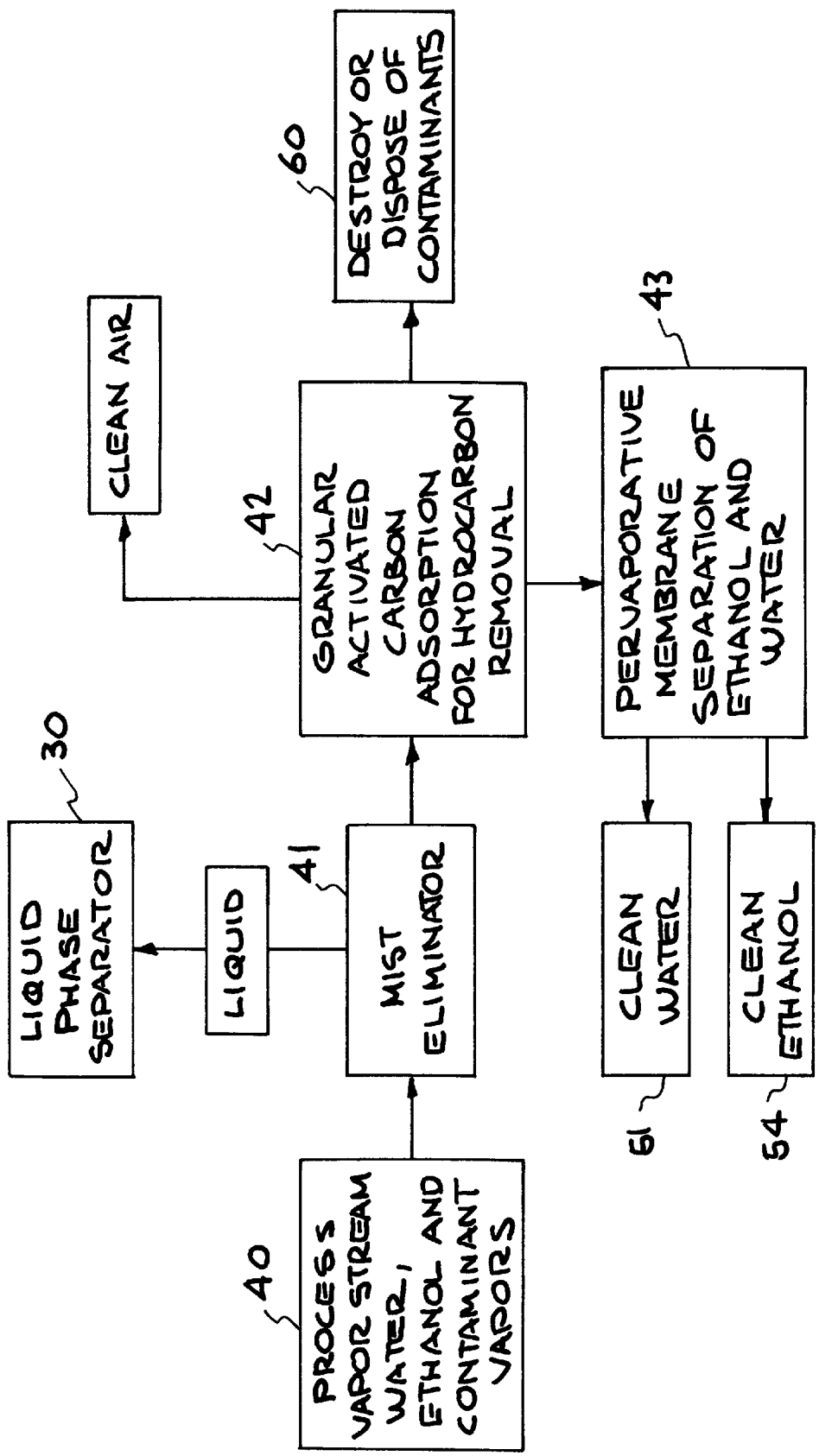
FIG. 2 shows the vapor phase separation process of the effluent.
Figure 3:
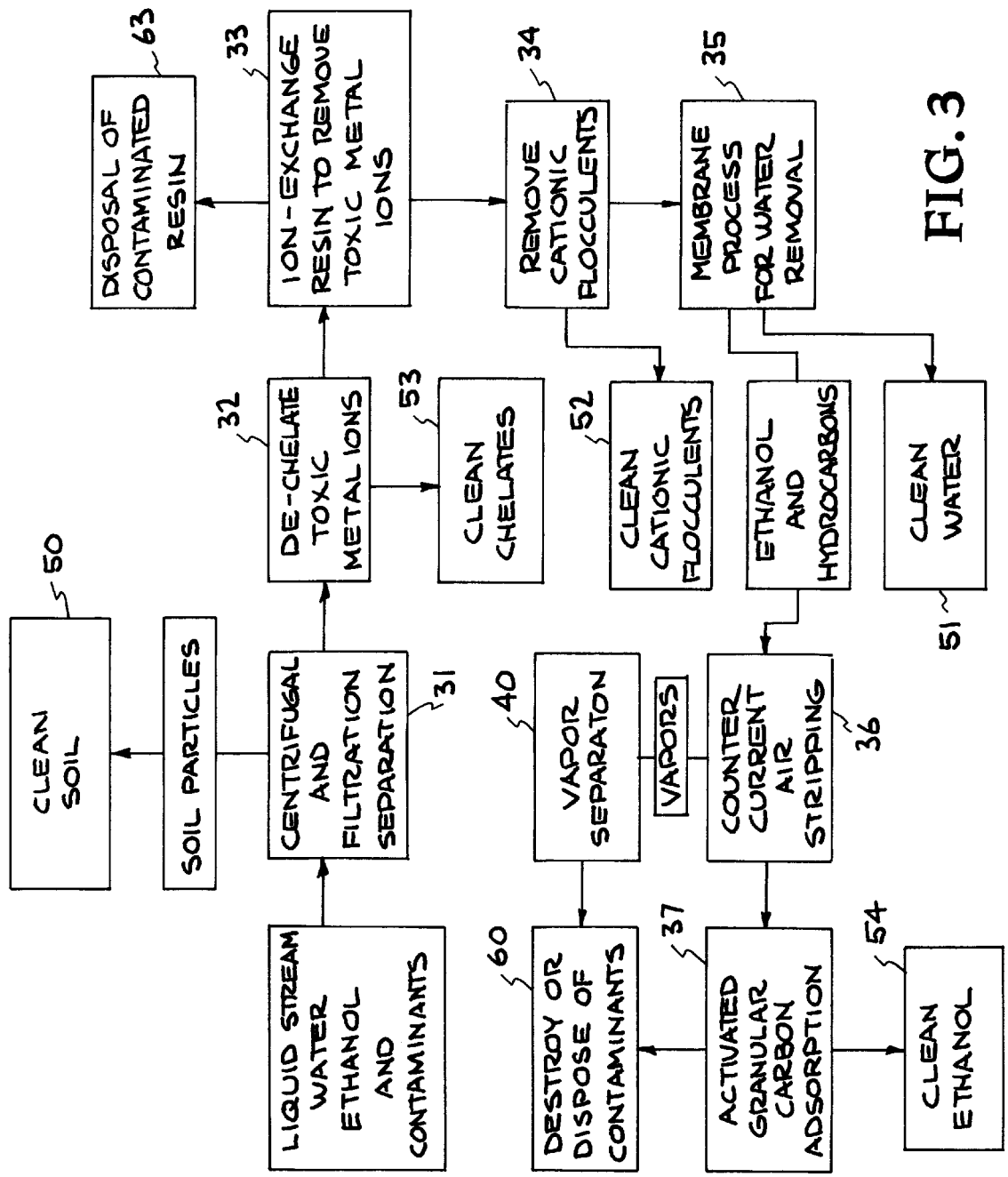
FIG. 3 shows a liquid phase effluent separation process.

The vapor phase separation, process 40, separates the vapor phase mixture into water vapor, ethanol vapor, and hydrocarbon contaminant vapors; the hydrocarbon contaminants are either destroy or disposed. The liquid phase separator process, (30), performs the following separations: soil particles, chelates, toxic metal ions, cationic flocculents, fuel and halogenated hydrocarbons, water, and ethanol; the toxic metal ions are disposed, and the hydrophilic hydrocarbons and/or the hydrophobic fuel and halogenated hydrocarbons are either destroyed or disposed. From each of the phase separators, the remediation chemicals are temporarily stored and are reinjected into the subsurface. The recycling process is continued until the chemical analyses determines that the treated subsurface is sufficiently decontaminated according to regulatory standards. FIGS. 2 and 3 illustrate the detailed processes by which the vapor and liquid phase separations occur, respectively.

The incoming vapor stream into process 40 contains a mixture of entrained air, ethanol, water, hydrophilic hydrocarbons and/or the hydrophobic fuel and halogenated hydrocarbon vapors. The mist eliminator, process 41, removes and purifies any entrained air, and condenses a fraction of the water vapor, returning it to the liquid phase separator, process 30. The remaining vapors containing a mixture of water vapor, ethanol, hydrophilic hydrocarbons and/or the hydrophobic fuel and halogenated hydrocarbons are passed through a granular activated carbon bed where the hydrophobic fuel and halogenated hydrocarbons are selectively adsorbed. The activated carbon can be periodically heated to desorb the contaminant hydrocarbons. In process 60, any halogenated hydrocarbons can be destroyed by irradiation with ultra-violet light, and the fuel hydrocarbons can be oxidized completely to produce carbon dioxide and water.

After the hydrocarbon contaminants have been stripped from the vapor stream, the remaining ethanol-water vapor mixture is separated in process 43. Process 43 involves a pervaporative membrane separation of the hydrophilic hydrocarbons-ethanol-water vapor mixture where a high pressure is applied to one side of the membrane, and a low pressure side, often from the condensation of the permeating vapor, to achieve efficient separation. If hydrophilic hydrocarbons are present, they should be removed first by first using appropriate membrane, distillation, or air-stripping process. The final stage will involve membrane separation of the ethanol from the water. From process 43, clean water is stored in tank (51), and clean ethanol is stored in tank 52.

The liquid phase stream coming into process 30 contains a mixture of the following materials: suspended soil particles, chelates, toxic metal ions, chelated toxic metal ions, cationic flocculents, hydrophilic hydrocarbons, and hydrophobic fuel and halogenated hydrocarbons that are dissolved in water and ethanol. The object of this liquid phase process is to remove contaminants from the stream, and separate the chemicals used in the remediation process for recycling.

Referring to FIG. 3, process 31 removes suspended soil particles from the effluent stream. A large fraction of the suspended soil particles can be removed in a gravitational settling tank. The remaining suspended particles can be removed from the liquid by a combination of centrifugal and filtration processes. The recovered soil particles are washed with ethanol and water mixture, to remove any contaminates adhering to the soil particle surfaces. The clean soil is stored in bin 50 until the subsurface remediation process is completed. The ethanol and water mixture used to clean the soil particles are sent to the liquid stream for decontamination and separation. For purposes of this invention, a chemical or water is clean when any residual amounts of chemicals are trace amounts at or below regulatory standards, i.e., any potential toxic materials are at or below regulatory standards.

The chelation of the toxic metal ions can be reversed by adjusting the acidity or pH of the water mixture (process 32). The chelates can be recovered, decontaminated, and stored for reuse in tank 53. The effluent stream is then passed through an ion-exchange resin, or equivalent module denoted by process 33, to remove such ions from the liquid stream. After the ion-exchange resin or equivalent module becomes saturated with toxic metal ions, it is disposed in process 63.

The next treatment phase is the recovery of cationic flocculents in process 34. Since potential active ions in the cationic flocculents are divalent calcium, and trivalent aluminum and iron ions, they are readily removed from the liquid stream by dramatically raising the pH and precipitating these ions as hydroxides. These cationic flocculents are then removed, decontaminated, and stored for reuse in tank 52.

The following process, 35, utilizes a membrane process, in one or modules, to remove water from the remaining mixture of ethanol and hydrocarbon contaminants. The clean water is then stored in water tank 51.

The remaining liquid stream will contain a mixture of ethanol and hydrophilic hydrocarbons and hydrophobic fuel and halogenated hydrocarbons. A fraction of the hydrocarbons can be separated by counter-current air stripping, process 36 to remove the most volatile contaminants. The vapor mixture will be sent to process 40 to remove these hydrocarbons and recover the ethanol vapors. The remaining liquid phase mixture will be ethanol, hydrophilic hydrocarbons, and dissolved heavy molecular weight hydrocarbons. This mixture is treated by process 37, an activated granular carbon adsorption bed. From this process, pure ethanol is recovered, and stored in tank 54. The hydrophilic hydrocarbons, and the hydrophobic fuel and halogenated hydrocarbons are desorbed from the activated granular carbon adsorption bed, and then they are either destroyed or disposed.

Changes and modifications in the specifically described embodiments can be carried out without departing from the scope of the invention, which is intended to be limited by the scope of the appended claims.

The invention claimed is:

1. A method for separation of soil toxic metals ions, hydrophilic hydrocarbons, hydrophobic fuel, halogenated hydrocarbons, cationic flocculent and ethanol recovery from a liquid phase stream, comprising:

removing soil particles from said liquid phase stream;

dechelating mobilized toxic metal ions within said liquid stream, and recovering chelates;

removing toxic metal ions from said dechelated liquid stream;

recovering cationic flocculents from said liquid stream treated to remove toxic metal ions;

separating said treated liquid stream and recovering clean water and ethanol containing hydrocarbons and hydrophobic fuel; and separating and reclaiming clean ethanol from contaminated hydrophilic hydrocarbons, hydrophobic hydrocarbons vapor streams, hydrophobic fuel and halogenated hydrocarbons within said ethanol containing stream.

2. The method of claim 1, wherein the step of removing soil particles includes removing, with an effluent settling tank, soil particles from said liquid phase stream.

3. The method of claim 2, wherein the step of removing soil particles includes removing, with an effluent settling tank and a centrifuge and filter, soil particles from said liquid phase stream.

4. The method of claim 1, wherein the step of dechelating mobilized toxic metal ions within said liquid phase stream includes adjusting the pH of the effluent stream and removing the dechelated toxic metal ions with an ion-exchange resin technology.

5. The method of claim 1, wherein the step of removing ethanol and hydrocarbons and fuel from said liquid phase stream includes counter-current air stripping.

6. The method of claim 5, wherein the step of removing ethanol further includes passing a resulting air stream containing ethanol through a bed of activated carbon.

7. The method of claim 1, wherein the step of removing hydrophilic hydrocarbons from the effluent stream includes distillation.

8. The method of claim 7, further comprising destroying halogenated hydrocarbons by irradiating them with ultraviolet light.

9. The method of claim 1, wherein the separating and recovering step includes separation of hydrophilic contaminants and ethanol includes a process of fractional distillation.

10. The method of claim 1, wherein the separating and recovering step includes separation of hydrophilic contaminants and ethanol by a process of molecular membrane pervaporation.

11. The method of claim 1, wherein said vapor stream comprises entrained air, said method further comprising the step of using a mist eliminator to remove and purify said entrained air and to condense water vapor.

12. The method of claim 1, wherein the separating and reclaiming toxic metal ions from the liquid phase stream by passing the effluent stream through an ion-exchange resin.

13. The method of claim 1, wherein the step of recovering chelates and cationic flocculents includes raising the pH and precipitating ions as hydroxides.

\* \* \* \* \*